Patented Jan. 22, 1935

1,988,476

UNITED STATES PATENT OFFICE 1,988,476

LUMINOUS MATERIAL

Jacques Edwin Brandenberger, Neuilly, France, assignor to Du Pont Celophane Company, Inc., New York, N. Y., a corporation of Delaware No Drawing. Application September 29, 1931, Serial No. 565,923. In France October 8, 1930

1 Claim. (Cl. 154—46)

This invention relates to luminescent materials. More particularly the invention relates to sheets of transparent cellulosic materials which are radio-active or phosphorescent. The invention relates still more particularly to luminescent lamp shades.

In the search for decorative and useful materials for use in homes or in offices the cellulose esters and ethers together with the regenerated celluloses have found favor. Because of their low cost and transparent qualities when made up in the form of films they have been used for making decorative lamp shades and even for windows.

It is an object of this invention to prepare a decorative and useful material from transparent films of cellulosic materials. Other objects of the invention will be in part apparent and in part set forth in the following specification.

The objects of this invention are accomplished by forming sheets of transparent or translucent cellulosic material which have radio-active or phosphorescent qualities.

In the practice of my invention a film, for instance of cellulose acetate, is immersed in a tank containing a coating composition which includes a substance such as calcium sulphide, or, in minute quantities a substance such as radium. When the composition dries, if the phosphorescent material has been used, the exposure thereof to light will give the material a luminescent appearance in the darkness. This luminescence disappears after a short time unless the material is maintained in the vicinity of a source of light. If a radio-active substance is included in the coating composition, the film will be luminous without exposure to light.

If desired, a sheet of material of considerable stiffness can be made by joining two sheets of cellulosic material with an adhesive which contains a phosphorescent or radio-active substance. Since the sheets are transparent, light will reach and activate the phosphorescent material.

The materials included within the scope of this invention are transparent cellulosic substances, such as the cellulose ethers, cellulose esters, and regenerated celluloses. The luminescent materials included within the invention are the radio-active materials in general and the phosphorescent materials in general. Among the radio-active materials may be mentioned those which contain radium, uranium, thorium, potassium, rubidium, although the latter two are so feebly radio-active as to be of little use. Among the phosphorescent materials are the alkaline earth sulphides, such as zinc sulphide, calcium sulphide, barium sulphide, phosphorus and certain of its compounds, although the nature of phosphorus makes its use alone undesirable.

The material of my invention finds great utility in the manufacture of decorative lamp shades. This is particularly true of those shades which embody phosphorescent materials, the proximity of the shade to the source of light acting to keep them strongly luminescent at all times.

An advantage of my invention consists in the formation of a new material having high utility. Another advantage of the invention lies in the manner of applying the phosphorescent material to the transparent material. Other advantages of the invention will be apparent.

As many apparently widely different embodiments of this invention may be made without departing from the spirit and scope thereof, it is to be understood that I do not limit myself to the specific embodiments thereof except as defined in the appended claim.

I claim:

An article of manufacture comprising two sheets of flexible transparent cellulosic material having flexibility on the order of a pellicle of cellulose acetate or regenerated cellulose joined by an adhesive containing a luminescent material.

JACQUES EDWIN BRANDENBERGER.